(12) United States Patent
Jegatheeson (10) Patent No.: US 6,640,659 B1
(45) Date of Patent: Nov. 4, 2003

(54) CONTINUOUSLY VARIABLE TRANSMISSION

(75) Inventor: Muthvetpillai Jegatheeson, Auckland (NZ)

(73) Assignee: Gyro Holdings Limited, Auckland (NZ)

( * ) Notice: Subject to any disclaimer, the term of this patent is extended or adjusted under 35 U.S.C. 154(b) by 0 days.

(21) Appl. No.: 09/890,349

(22) PCT Filed: Nov. 10, 1999

(86) PCT No.: PCT/NZ99/00186

§ 371 (c)(1),
(2), (4) Date: Jul. 30, 2001

(87) PCT Pub. No.: WO00/45068

PCT Pub. Date: Aug. 3, 2000

(30) Foreign Application Priority Data

Jan. 28, 1999 (NZ) ................................................. 333935
Apr. 16, 1999 (NZ) ................................................. 335236

(51) Int. Cl.[7] ............................................ G01C 19/02
(52) U.S. Cl. ........................................ 74/5.22; 74/5 R
(58) Field of Search .......................... 74/5.22, 5 R, 64, 74/111–169; 192/48.92; 475/336, 343, 231, 268

(56) References Cited

U.S. PATENT DOCUMENTS

| 3,394,619 A | | 7/1968 | Preston | |
|---|---|---|---|---|
| 3,439,561 A | | 4/1969 | Preston | |
| 3,540,308 A | | 11/1970 | Preston | |
| 3,851,545 A | | 12/1974 | Gumlich | |
| 3,955,428 A | * | 5/1976 | Ward | 192/41 S |
| 4,161,889 A | | 7/1979 | Hinds | |
| 4,169,391 A | | 10/1979 | Schonberger | |
| 4,179,943 A | * | 12/1979 | Gamba | 74/64 |
| 4,295,381 A | * | 10/1981 | Hinds | 74/5 R |
| 4,336,870 A | * | 6/1982 | Shea | 192/105 CF |
| 4,361,055 A | * | 11/1982 | Kinson | 475/268 |
| 4,608,875 A | * | 9/1986 | Wallace | 475/268 |
| 5,134,894 A | * | 8/1992 | Tam | 475/267 |
| 5,243,868 A | * | 9/1993 | Schonberger | 74/112 |
| 5,313,850 A | * | 5/1994 | Finvold et al. | 290/1 R |
| 5,790,049 A | * | 8/1998 | Harrell | 340/870.28 |

FOREIGN PATENT DOCUMENTS

| DE | 43 37 858 A1 | 5/1995 |
|---|---|---|
| WO | 93/17261 | 9/1993 |

* cited by examiner

Primary Examiner—Rodney H. Bonck
Assistant Examiner—David D. Le
(74) Attorney, Agent, or Firm—Young & Thompson (57) ABSTRACT

A transmission is provided which includes a fixed housing or support, an input part moveable relative to the support and a torque shaft, a first one-way clutch between the torque shaft and the driven shaft, linkage elements rotatable about the axis of rotation of the driven shaft under the influence of the input parts and an inertial body mounted on the linkage elements to be cyclically angularly deflected in response to the input part, the reaction forces generated by the inertial body as it cyclically deflected being applied to the torque shaft as a positive and negative torque and the torque shaft being connected over a second one-way clutch opposite to the first one-way clutch either to the support or to the driven shaft over a rotation reversal system whereby the driven shaft can be rotated by the torque shaft in one sense of rotation only.

59 Claims, 8 Drawing Sheets

CONTINUOUSLY VARIABLE TRANSMISSION

FIELD OF THE INVENTION

This invention relates to a continuously variable transmission and more particularly to a continuously variable transmission in which primarily inertial reactions on a suitably arranged mass distribution are employed as coupling forces and torques to enable net transfer of energy from an input to an output. The time integral of the output torque and, if applicable, the input torque resulting from these inertial reactions is balanced by the time integral of a reaction torque resulting from these inertial reactions. The reaction torque is applied to the fixed surrounding or the transmission housing or otherwise so as to enable the transmission process to take place in a cyclic manner. In some cases during the cyclic movements of the transmission mechanisms, forces and moments other than the aforesaid inertial reactions may be additionally or otherwise employed to cause transfer of energy from the input to the output of the transmission. Even those cyclic movements of the transmission mechanisms themselves required to cause transfer of energy from the input to the output by other than the aforesaid inertial reactions, may be caused or assisted by means other than inertial reactions.

BACKGROUND ART

Transmissions which have fixed input/output speed ratios are not suitable for a wide variety of operating conditions. In order to match the input/output variables, namely the torque and speed, so that transmission losses are reduced and to allow optimum operating conditions at the input/output and to avoid excessive stresses developing in the transmission under transient conditions at the input/output, variable transmissions are necessary.

Using discretely variable transmissions, the speed ratio is changed in a finite number of steps. The above said benefits of a variable transmission are achieved only partially by this method.

Further, the number of steps are limited by economic and practical reasons.

A variety of continuously variable transmissions are known. In the main they use frictional elements, hydraulic elements (motor or turbine/pump) or electro-magnetic elements (motor/generator) to transmit power. With the exception of electro-magnetic methods, these transmissions are inefficient due to slip under transient conditions of acceleration and deceleration due to limited response capacity, especially under rapidly changing input/output conditions. Electro-magnetic systems to avoid such inefficiencies can be very costly and not practical under many circumstances due to space and weight conditions.

The applicant is aware of a number of prior proposals which endeavour to utilize gyroscopic rotors to achieve continuously variable transmission.

The device disclosed in U.S. Pat. No. 4,169,391 relied on varying the moment of inertia of the rotors by hydraulic means to generate a net output torque and to match the input/output conditions. This is extremely difficult to achieve especially under rapidly varying input/output conditions. Furthermore, the hydraulic system described is complex.

The device disclosed in the U.S. Pat. No. 3,851,545 on the other hand relied on maintaining appropriate spin orientations by external power input. This adds significant complexity to the invention disclosed especially under rapidly varying input/output conditions.

The applicant under the International Application PCT/NZ92/00004, disclosed a device based on gyroscopic rotors. This device relied on pumping action by Coulomb damped oscillation ("vibration") of the gyroscopic rotors about the spin axis. A hydraulic system capable of a fraction of the total power transmission was required to cause the vibration and the "vibration" is unpredictable under high damping ratios. Further, spring elements are required to cause the "vibration" and hence hysteresis losses. An additional speed controller device was required to achieve a useful operating range.

The applicant is also aware of another proposal in which a gyroscopic rotor is mounted on the inner frame of a gimbal support and the outer frame of the gimbal is oscillated to cause gyroscopic torque alternating in direction. Here again with a spring system, the proposal was to cause effectively a coulomb damped vibration and from this vibration, the total power transmission was to have occurred either through hydraulic means or through an equivalent of a complex coulomb damping that would result from the resistance at the output through one-way clutches. The unpredictability of the proposed oscillation in this system is thus very high and the spring system will result in greater hysteresis losses since total power transmitted resulted directly from the "vibration". Further, only small amplitudes of oscillation were allowed, thus requiring high forces to cause a given power transmission.

OBJECT

Accordingly, it is an object of the present invention to provide a continuously variable transmission in which such disadvantages are reduced.

STATEMENTS OF THE INVENTION

In accordance with the present invention there is provided a transmission comprising a fixed housing or support, input means moveable relative to said support, a torque shaft rotatable about its longitudinal axis, a driven shaft arranged to be rotated about its longitudinal axis by the torque shaft, a first one way clutch between the torque shaft and driven shaft, linkage means rotatable about the axis of rotation of the driven shaft under the influence of said input means and an inertial body mounted on the linkage means to be cyclically angularly deflected in response to the input means, the reaction forces generated by the inertial body as it is cyclically deflected being applied to the torque shaft as positive and negative torque and the torque shaft being connected over a second one-way clutch opposite to the first one-way clutch either to said support or to the driven shaft over a rotation reversal system whereby the driven shaft can be rotated by the torque shaft in one sense of rotation only.

The inertial body preferably comprises a rotor.

In one embodiment of the invention the linkage may comprise an outer frame rotatable about a first frame axis and an inner frame rotatable relative to the outer frame about a frame axis perpendicular to the first frame axis, the inner frame carrying said inertial body. The outer frame may be fixed to the input means for rotation therewith. The inertial body may be a rotor rotating about an axis orthogonal to the second frame axis. The torque shaft may be connected by gearing to the inner frame such that torque applied by the inertial body to the inner frame, when deflected by rotation of the inner frame, will be transmitted to the torque shaft.

In another embodiment of the invention the input means may comprise a drive shaft reciprocable along an axis generally coincident with or parallel to that of the output shaft, the inertial body being arranged on the linkage means so as to be angularly deflected in a plane containing or parallel with the axis of the driven shaft as the drive shaft reciprocates. The linkage may be an elbow linkage pivotally connected at one end to the drive shaft and at its other end being immovable relative to the driven shaft along the axis of the latter, the inertial body being mounted on one arm of the elbow linkage so as to be angularly deflected as the drive shaft reciprocates. The linkage may comprise a gimbal the outer frame of which is fixed relative to the torque shaft and rotatable relative to the drive shaft, the inertial body being mounted on the inner frame of the gimbal and means being provided to rotate the inner frame of the gimbal in response to reciprocation of the drive shaft. The inner frame may be connected to the drive shaft so as to be oscillated as the drive shaft reciprocates. The connection between the drive shaft and the inner frame may be connecting rod means or rack-and-pinion means. In this arrangement if the inertial body is a rotor, means may be provided between the inner frame and the rotor whereby the input also causes rotation of the rotor.

Means may be provided whereby the speed of rotation of the rotor can be varied relative to the input.

Two meshing gears may be interposed between the first one-way clutch and the driven shaft and three meshing gears may be interposed between the second one-way clutch and the driven shaft such that whichever clutch is not freewheeling will drive the driven shaft in the same sense of rotation.

The input means may be additionally coupled to the output means via a third one way clutch such that the input means is driven by the output means when the speed of the latter exceeds that of the input means, in all other conditions the third one way clutch freewheeling. The third one way clutch may be coupled to the input means via a variable ratio gear system.

In yet another embodiment of this invention the output means may be a body rotatable about a fixed support, the input means may be a drive shaft reciprocable toward and away from said fixed support, the linkage may comprise an elbow linkage pivotally connected at one end to the drive shaft and at its other end to a frame rotatable with said body and the torque shaft may be connected over said first one-way clutch with said support and over said second one-way clutch with the frame.

BRIEF DESCRIPTION OF THE DRAWINGS

Various embodiments of the present invention are described, by way of example only, with reference to the accompanying drawings, in which.

DESCRIPTION

Figure 1:
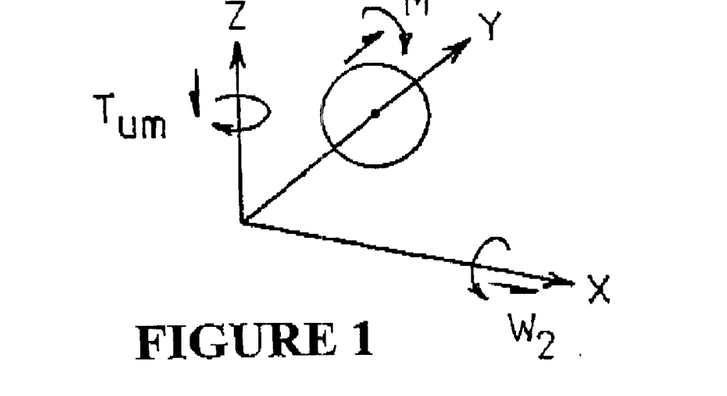
FIG. 1 illustrates schematically the principles relating to gyroscopic torque on a rotor due to applied precession.

Referring firstly to FIG. 1, the general principles related to gyroscopic torque generation are described as follows:

A rotor A spinning about the Y-axis has an angular momentum $M=Iw_1$ where I=moment of inertia of the rotor and $w_1$=its angular velocity. This rotor may be driven by the input, output or an independent source.

If this rotor A is rotated about the X-axis with angular velocity $w_2$ then a gyroscopic precession torque $T_{UM}$ about the Z-axis is generated. The torque T is given by the relationship:

$$T = M \times w_2 = I w_1 w_2$$

In the following description, two of the possible types of transmissions, referred to as Type A and Type B are explained. Basically, the operation of the transmissions takes place in a cyclic manner generating the output torque and the reaction torque over a cycle.

Type A: One of the two-and-fro input motions results in the coupling of the torque shaft to an output shaft through a one-way clutch while the other of the two-and-fro motions of the input results in the coupling of the torque shaft to the ground or to another output shaft through another opposite one-way clutch.

Type B: Substantially each of the input motions in either direction results in output torque being applied to the output shaft and the reaction torque being applied to the ground. This form of operation requires output rotation at a speed greater than the input frequency for smooth operation.

Figure 14:
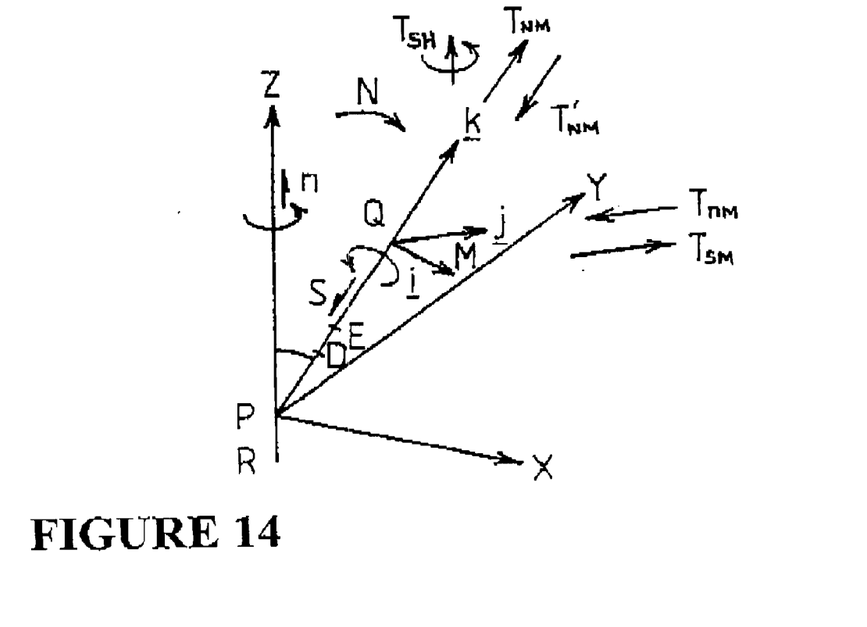
FIG. 14 illustrates schematically the application of FIG. 1 to the embodiments shown in FIG. 2 and FIG. 6, and FIG. 15 schematically illustrates a further modification of the invention.

In FIG. 14, X, Y, Z are a set of fixed mutually perpendicular axes and i, j, k are a set of mutually perpendicular vectors attached to DQ so that vector M is always coincident with vector j. $T_{NM}$ is the reaction torque due to the precession N, given by $T_{NM}=M \times N$ in the direction k.

n is the rotational speed of the shaft DQ about the axis of PR and S is the rotational speed of DQ about its own axis.

Referring to FIG. 14, reaction torque $T_{NM}$ is generated along the axis of the shaft DQ due to the rotation N of the angular momentum vector M. If the rotation N is now reversed so that the apex angle of the cone described by DQ is decreasing, the reaction $T_{NM}$ will be generated canceling the previously generated torque $T_{NM}$ and the net torque on the shaft DQ will be zero over a cycle when the vector M is restored to its original dynamically equivalent position.

Figure 2:
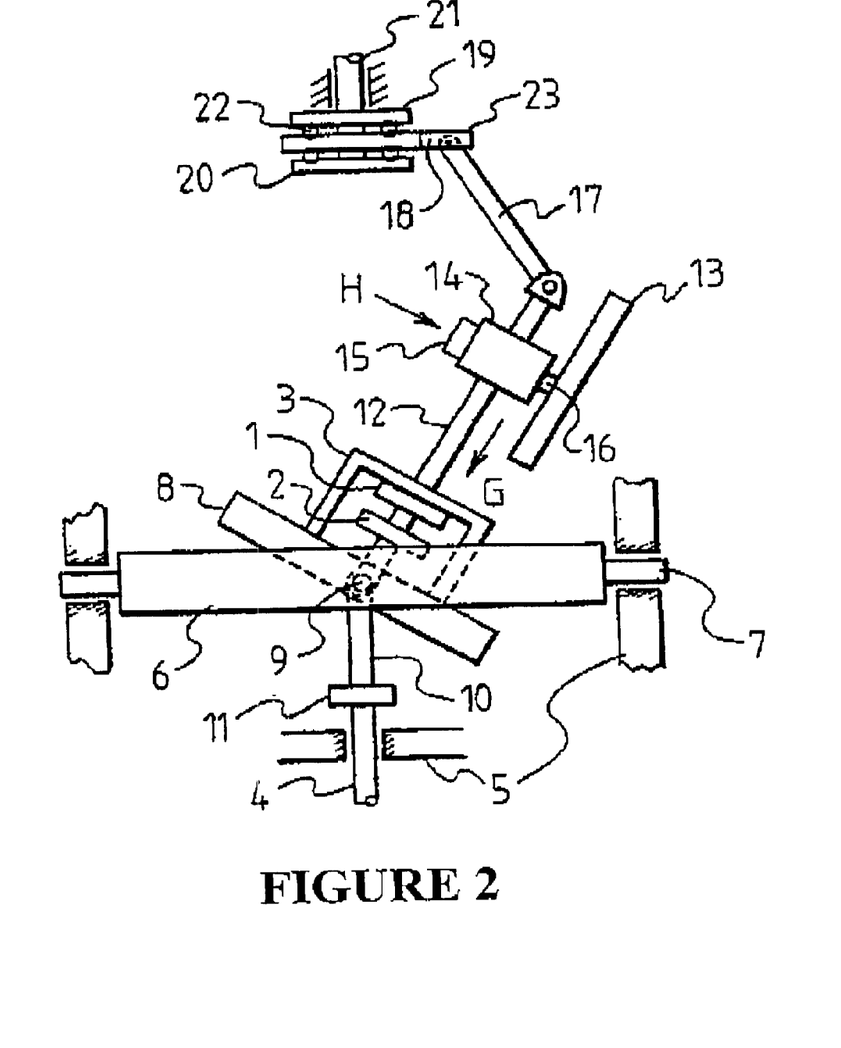
FIG. 2 shows diagrammatically a preferred embodiment of the invention utilizing the principles shown in FIG. 1.
Figure 3:
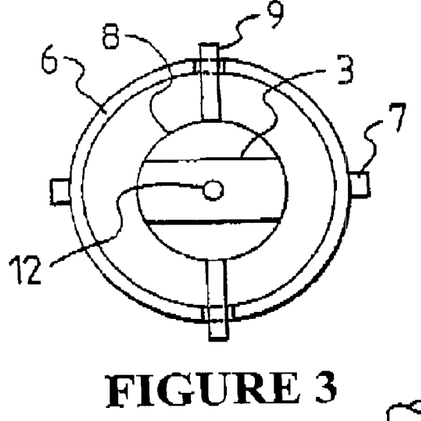
FIG. 3 is a scrap view in the direction of the arrow G in FIG. 2, when the frames 6 and 8 lie in the same plane.

Referring to one form of the Type A transmission shown in FIG. 2:

Clutch D couples shaft DQ to shaft DP in one sense of rotation and free-wheels in the other so that only torque $T_{NM}$ is transmitted to shaft PR. Clutch E couples shaft DQ to a fixed support in the other sense of rotation and free-wheels in the said one sense of rotation so that only $T_{NM}$ is transmitted to the support.

Thus torque $T_{NM}$ is transmitted to the shaft PR and the reaction torque is transmitted to the fixed frame by applying reciprocating precessions. This is the essence of the operation of the Type A transmission provided by the invention.

$T_{SM}$ is the reaction torque due to the precession S given by $T_{SM}=M \times S$ and in this case equal to zero since S=0, in Type A transmissions.

$T_{nM}$ is the reaction torque due to the precession n given by $T_{nM}=M \times n \cos ZPQ$ in the direction $-j$.

When n=0, no power is transmitted to the shaft PR although net torque is transmitted to the a shaft PR and $T_{nM}=0$. Thus pivoting of the shaft PQ to increase the angle ZPQ requires no input effort.

However when n is greater than zero, $T_{nM}$ is greater than zero and therefore input effort is required to increase the value of ZPQ and net power is transmitted to shaft PR.

During the application of the Torque $T'_{NM}$ the shaft DQ initially free-wheels and when synchronised, $T'_{NM}$ is transmitted to the swivel shaft support through the one-way clutch E. Likewise during the application of $T_{NM}$ the shaft DQ initially freewheels and when synchronised $T_{NM}$ is transmitted to the output shaft PR.

Figure 6:
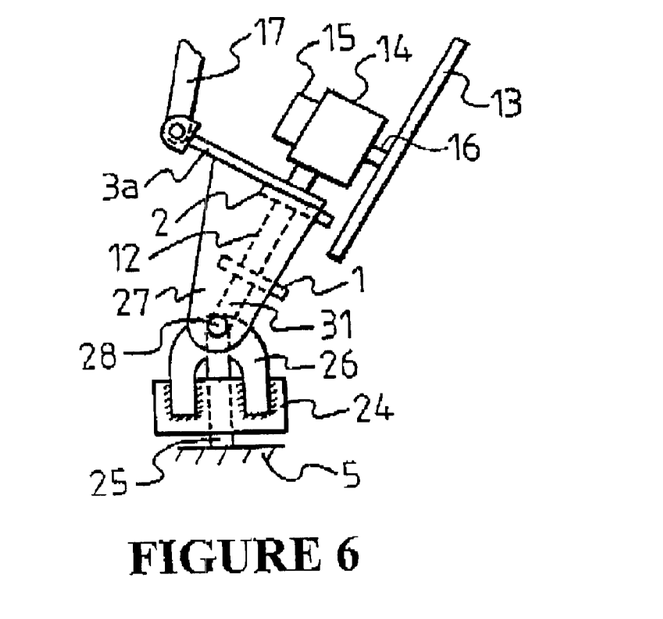
FIG. 6 shows diagrammatically an embodiment based on an alternative type of operation of the invention.

In the Type B transmission, shown in FIG. 6, S=0 only during the power transmission phase of the cycle and otherwise S does not equal zero.

Considering n>0, at the beginning of the cycle, let the precession N be in the opposite direction to that shown and S=0.

As the input precession N is applied the shaft DQ will be decelerated and S will increase until equal to a positive value n Cos ZPQ, reaction torque will be applied to the now fixed shaft PR through the one-way clutch D due to the dominant output rotation over the input precession causing the vector M to swing to a dynamically equivalent direction opposite to that shown in FIG. 14.

Continued application of this input precession will cause the shaft DQ to accelerate back to synchronise with the output, resulting in S=0 and transmission of the output torque through the one-way clutch E to the shaft support. At the end of this input precession the cycle is completed whereby the vector M and the precession N will appear as shown in FIG. 14, as the shaft DQ is precessed twice the initial angle ZPQ. A similar sequence of events will occur even if the angle precessed is less.

The cycle will be repeated as the vector M is precessed, as before, in the opposite direction ie. N <0.

During the freewheeling which occurs preceding the reaction torque, some loss of vector orientation would occur and during the freewheeling that occurs preceding the output torque this would be corrected.

In FIG. 2 an output shaft 4 is rotatably mounted on a transmission housing 5. An outer frame 6 is rotatably supported on the housing 5 by means of co-axial shafts 7. An inner frame 8 is rotatably supported on the outer frame by means of co-axial shafts 9. A mis-alignment joint 10 such as a constant velocity joint is coupled to the shaft 4 so that the pivot point of the mis-alignment joint is preferably coincident with the intersection point of the pivot axes of the inner and outer frames. A flexible joint 11 capable of relatively small degrees of linear and angular mis-alignment may be provided between the shaft 4 and the mis-alignment joint 10 to accept any deviation between the intersection points. A shaft 12 is rotatably supported on a shaft support 3.

Figure 5:
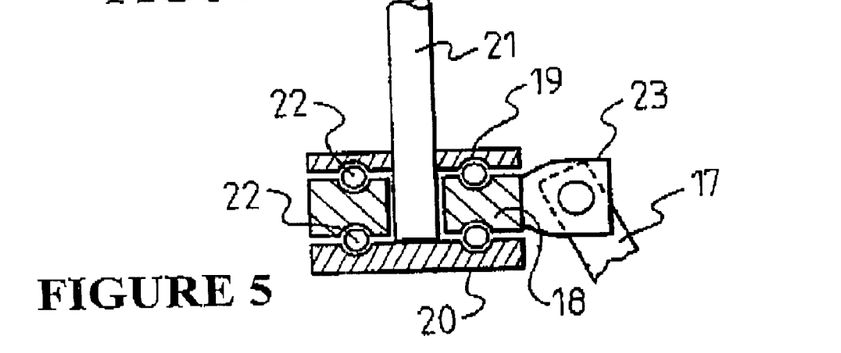
FIG. 5 is a cross-section through the upper part of FIG. 2.

The shaft 12 is connected to an input link 17 through a pin joint. In its simplest form, the link 17 is a rod with provisions for pin joints at its ends. Attached to an input shaft 21 are grooved flanges 19 and 20 to accept rolling elements 22 and flange 18 is rotatable mounted in between 19 and 20 and to accept the rolling elements 22. The flange 18 is provided with an extension such as a fork 23 to accept a pin joint with the input link 17 as shown in FIG. 5.

The input shaft 21 is co-axial with the output shaft 4 and a standard mechanism such as a crank/connecting rod may be used to provide a linear reciprocating motion of the input shaft 21 along the axis of the output shaft 4.

The reciprocating motion of the upper end of the input link 17 need not be truly linear. For example, it could be slightly arcuate, where the input is provided by a long horizontal lever. In this case, the link 17 is preferably connected at both ends by swivel joints.

Other forms of input drive could be cams, hydraulic or manual means.

A first one-way clutch 2 connects the shafts 12 and 4 while a second, opposite one-way clutch 1 connects the shaft 12 to the shaft support 3.

A rotor shaft support 14 is attached to the shaft 12 and a rotor 13 is rotatably mounted on 14 by means of a rotor shaft 16. 15 is a motor mounted on 14 and coupled to the rotor shaft 16.

The embodiment described above may be identified as a "Type A" transmission.

Figure 7:
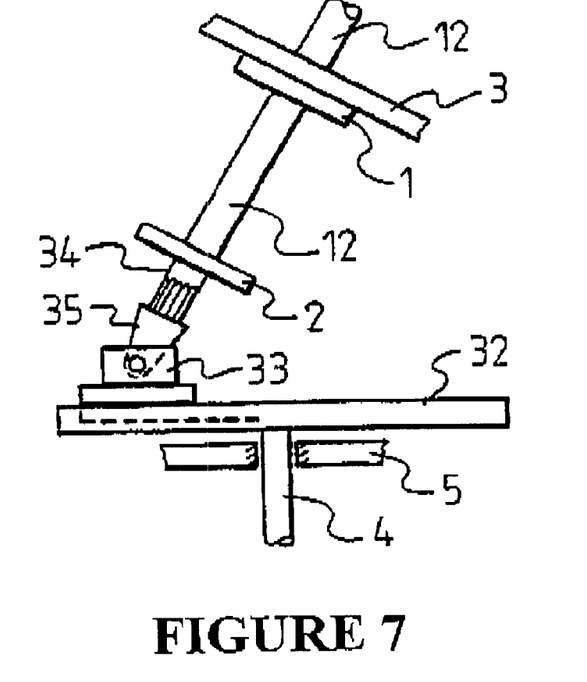
FIG. 7 shows diagrammatically an alternative arrangement to part of FIG. 2.

FIG. 7 shows an alternative arrangement for the Type A transmission in which the mis-alignment joint is avoided.

The torque shaft 12 in this case is extended past the pivot point and is coupled to one end of a shaft 34 through the one-way clutch 2. A hollow block 35 has internal splines and is connected to an element 33 by a pin joint. The shaft 34 has external splines engaged in the splines of the block 35. A plate 32 provides a groove in which the element 33 engages and is free to slide along a radius of the output shaft 4. The plate 32 is attached to the output shaft 4.

In operation, the torque from the shaft 12 is transmitted to the output shaft 4 through 2, 34, 35, 33 while the shaft 12 is free to pivot about its pivot point.

Figure 8:
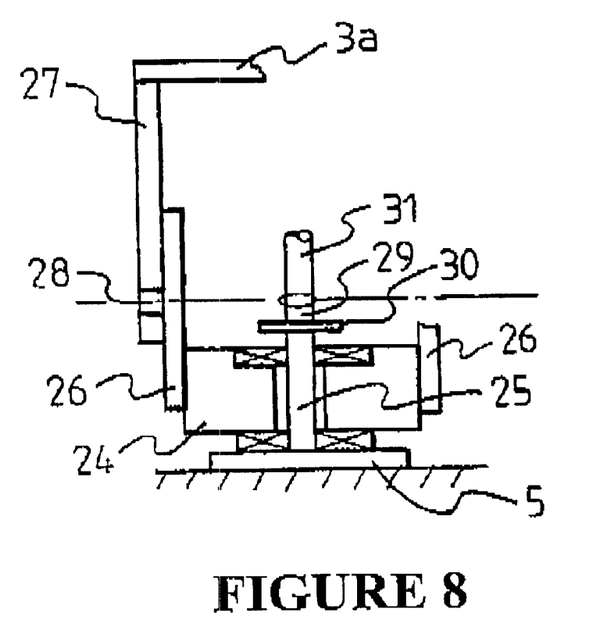
FIG. 8 is a cross-section in a vertical plane through the lower part of FIG. 6, FIGS. 9 and 10 are theoretical diagrams.

A variation of the Type A transmission described above is Type B transmission shown in FIG. 6 and FIG. 8. An output body 24 is rotatably mounted on the transmission housing 5. A fixed shaft 25 is fixed to the transmission housing co-axially with the output body 24. FIG. 8 shows an arrangement to satisfy the above wherein body 24 is mounted on shaft 25.

Trunnion support brackets 26 are attached to the body 24. Trunnion pins 28 may be attached to the brackets 26. Attached to a trunnion 27 is a torque shaft support 3a.

A mis-alignment joint 29 is coupled to the shaft 25 so that the pivot point of the mis-alignment joint lies on the axis of the trunnion pins 28. A flexible joint may be provided between the shaft 25 and the mis-alignment joint to accept any deviations.

The one-away clutch 1 connects the shaft 12 and a shaft 31 of the mis-alignment joint while the opposite one-way clutch 2 connects the shaft 12 to the shaft support 3a.

Figure 4:
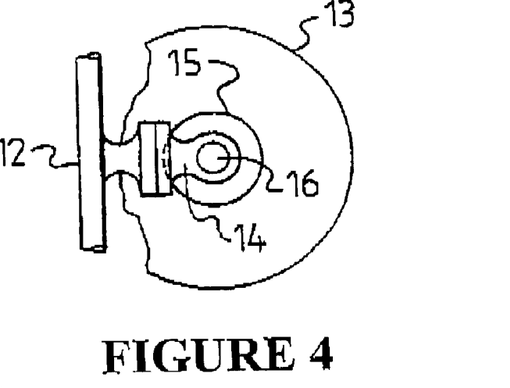
FIG. 4 is a scrap view in the direction of the arrow H in FIG. 2.

FIG. 4 applies to the rotor mounting details as for the FIG. 2.

FIG. 5 applies to the input shaft mechanism as for the FIG. 2. The input link 17 however is connected to 3a and not to the shaft 12.

As in FIG. 2, the input shaft 21 is co-axial with the body 24 and shaft 25 and moves linearly along the axis of the output body. The pivot between the input link 17 and the support 3a is offset from the axis of the input shaft 21 and output body 24.

Figure 10:
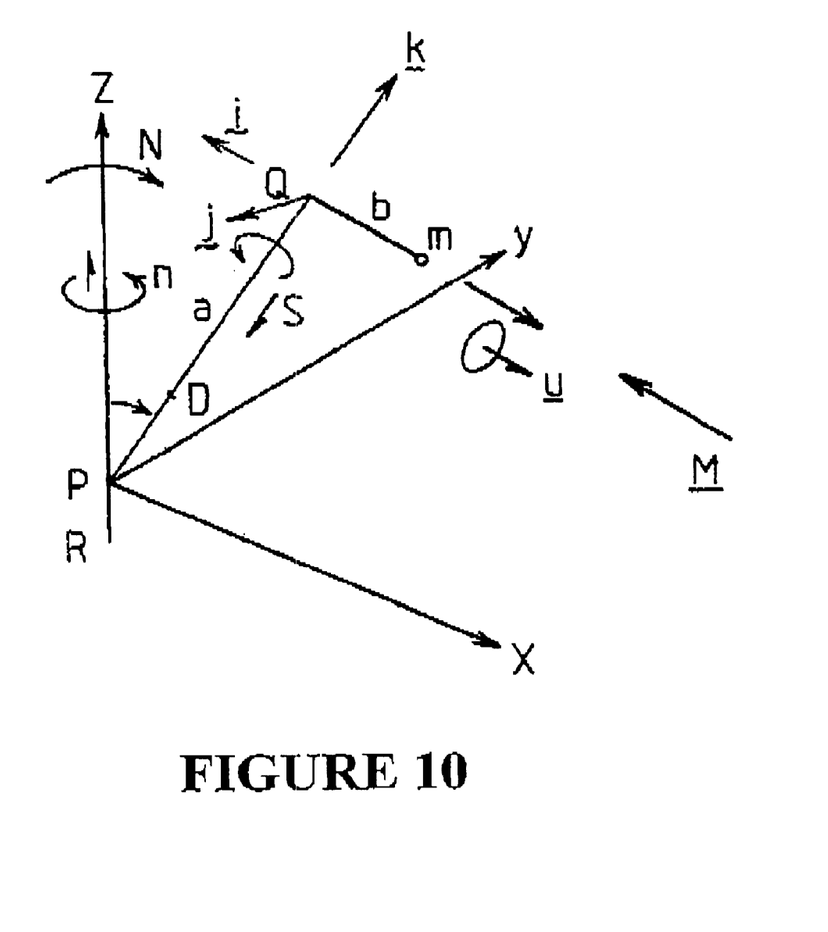

A variation to the embodiments described above relating to the Type B transmission is provided by complementing the gyroscopic rotor assembly with a "dead" mass appropriately as illustrated in FIG. 10.

Figure 9:
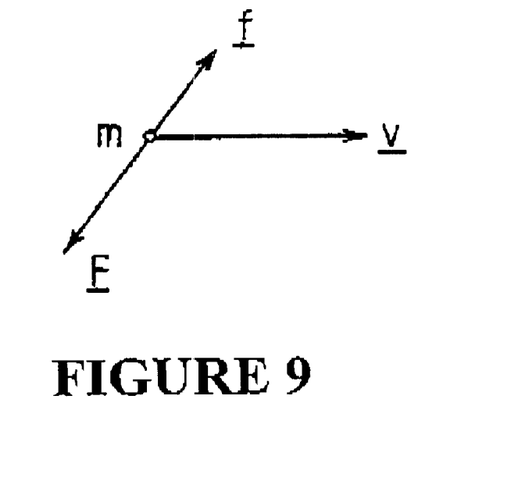

FIG. 9 shows the principle of inertial reaction on a mass "m" moving in the direction "v". "f" represents the acceleration of the mass and "F" represents the initial reaction of the mass.

In FIG. 10 for N<0 the inertial force on the mass "M" and the gyroscopic torque on the vector M will act together on the output of a Type B transmission. The gyroscopic vector M is necessary to cause the cyclic process of the Type B transmission.

Further, the work done against the gravitational force on the mass m during the "input stage" is also transmitted to the output during the "reversal stage", thus providing a further variation to the Type B transmission whereby a force such as gravity other than the inertial reaction is also utilised to transfer energy from the input to the output of the transmission.

Figure 11:
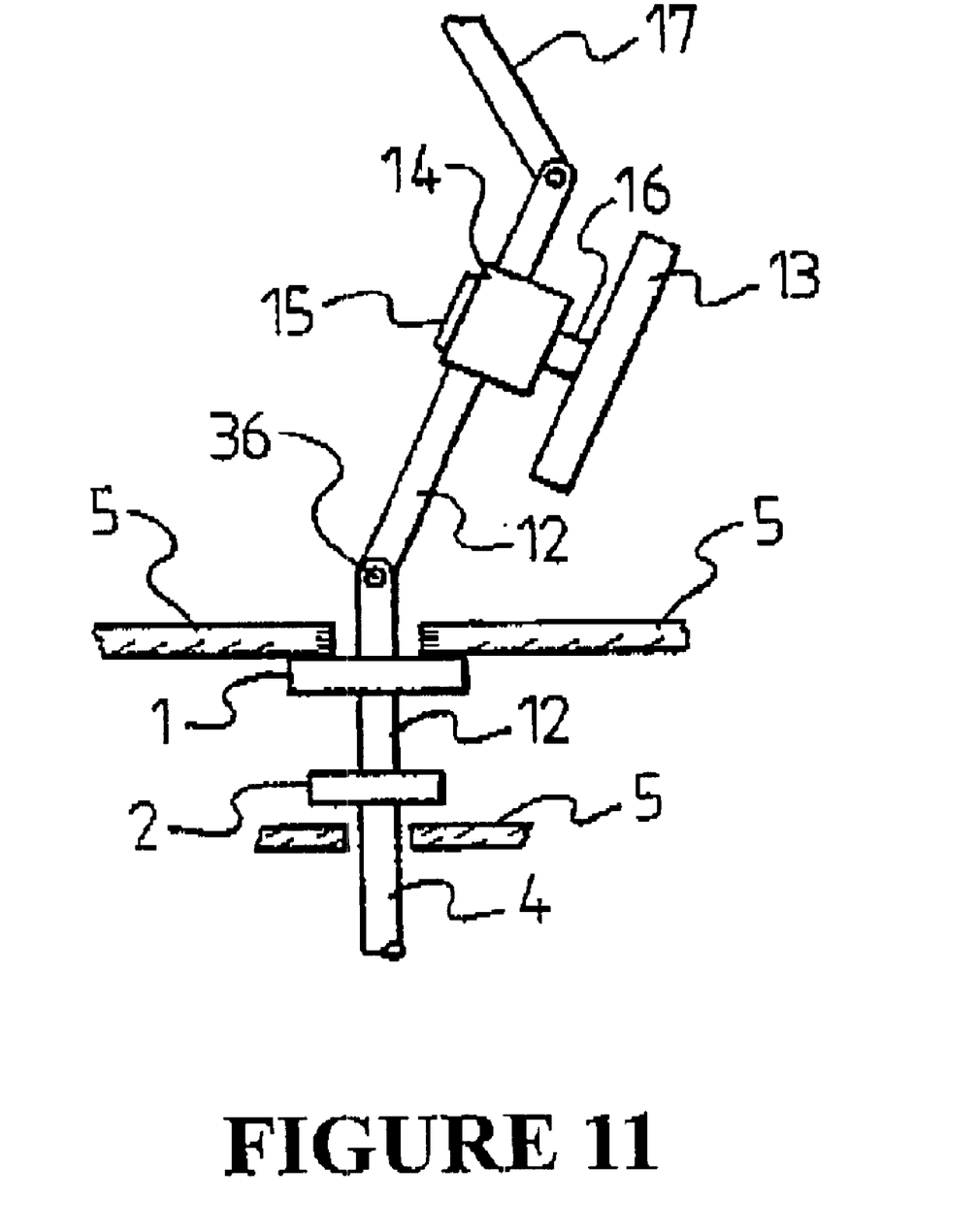
FIG. 11 shows diagrammatically another embodiment.

In FIG. 11 the pivot point for the mass distribution is provided "above" the torque shaft support 5 by a hinge joint 36. This embodiment is suitable for Type A transmissions. A variation to the Type A transmission described is provided by coupling the one way clutch 1 to another output instead of coupling to the housing, and this output could be combined to the output to the shaft 4 by means of a reversing gear arrangement as shown in FIG. 12.

Figure 12:
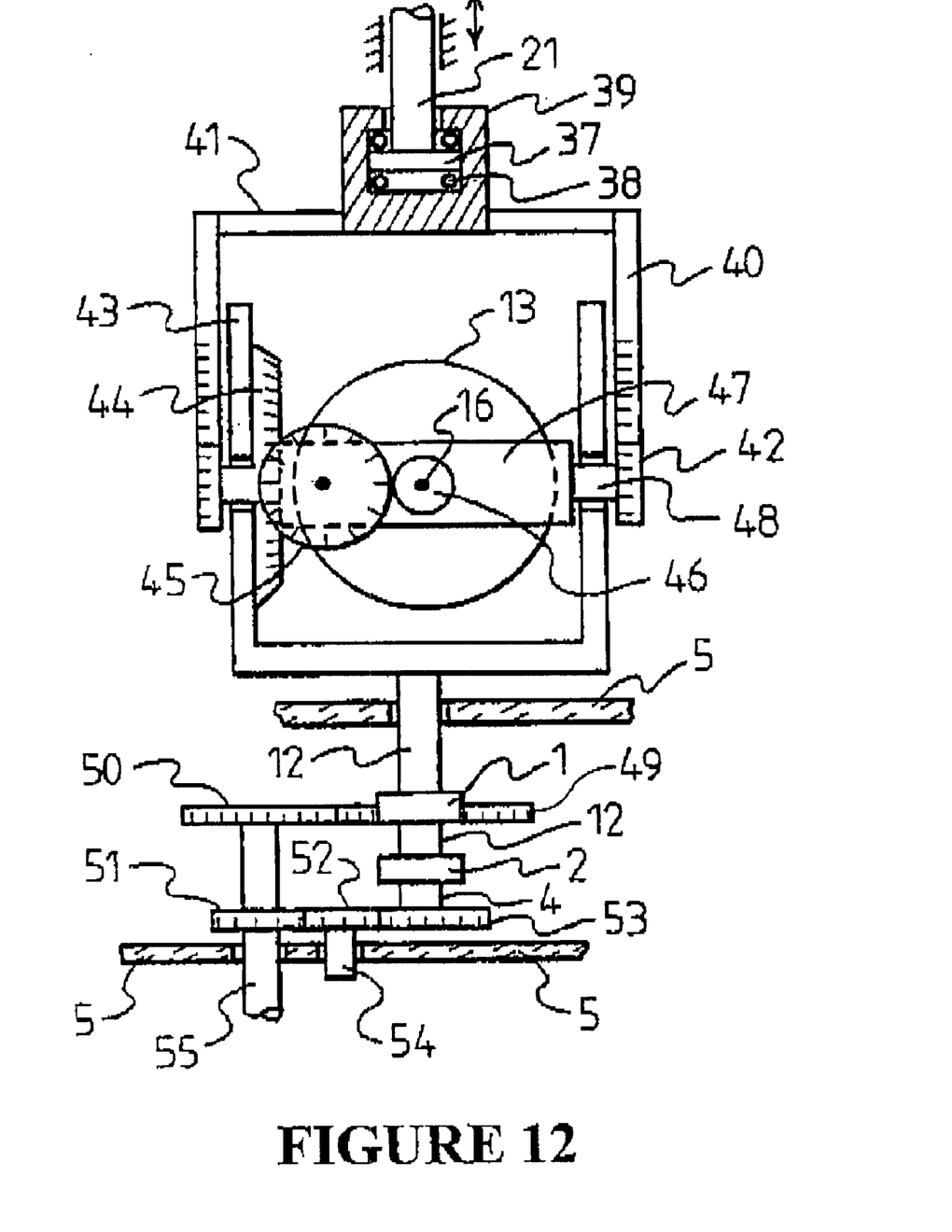
FIG. 12 shows diagrammatically a further embodiment.

FIG. 12 shows another preferred embodiment of Type A transmission with many interesting features. A fork 43 is attached to the shaft 12. The rotor shaft 16 is rotatably mounted on the frame 47. The frame 47 is rotatably mounted on the fork 43 by means of the shafts 48 attached to the frame 47 co-axially. The shaft 12 is rotatably mounted on the transmission housing 5.

Attached to the end of the input shaft 21 is a flange 37. Thrust bearings 38 are provided on both sides of this flange 37. The thrust bearings are housed in 39. Arms 41 are attached to 39 and to the racks 40 of the rack and pinion arrangement provided by 40 and the pinions 42. The pinions 42 are attached to the shafts 48. Thus the reciprocating motion of the input shaft 21 is translated into oscillation of the rotor shaft 16 about the axis of the shafts 48 thus creating the output torque and the reaction torque on the shaft 12.

In FIG. 12 a means of using the input motion to spin the rotor 13 is illustrated. A bevel gear 44 is attached to one of the forks 43 concentric with the shafts 48. A compound gear 45 is rotatably mounted on the frame 47. The bevel gear ring of 45 engages the gear 44 while the spur gear ring of 45 engages the gear 46. The gear 46 is coupled to the rotor shaft 16 through a one-way clutch. Thus the oscillation of the shafts 48 about their axis will cause the rotor 13 to spin in the direction determined by the one-way clutch.

The gears 50 and 51 are attached to the output shaft 55. The torque from the one-way clutch 1 is transmitted to the output gear 50 by the gear 49 attached to the one-way clutch 1.

The idle gear 52 reverses the torque from the other one-way clutch 2 and transmits it to the output shaft 55, via 53 and 51.

If it is desired that the speed of the rotor 13 should be variable independently of the input frequency this can be achieved by allowing the gear 44 to slip on fork 43.

The present invention may find particular applications in automobile transmissions and in power generation from fluctuating energy sources such as wind and waves.

However, the invention is not limited to these applications and several other possible uses are envisaged.

In automobile and other applications where output rotation is not always available, Type A transmission is readily applicable.

Type B operation is readily applicable where output rotation is available, as in power generation. Gyroscopic rotors have the advantage of being compact and a wide range of characteristics are possible. However in other applications use of a dead mass in conjunction with a gyroscopic rotor may be a cheaper option.

Forces and moments other than inertial reactions may be employed in conjunction with these mechanisms in particular by the Type B transmission. By causing the cyclic movements of the torque shaft as in the Type B operation and storing potential energy during the input stage and releasing the stored energy during the reversal stage, a continuously variable transmission can be obtained even without the use of inertial reactions.

In the following, examples of modifications are provided.

The embodiment shown in FIG. 12 may be modified by substituting the racks 40 and the pinions 42 with a crank and connecting rod mechanism. The pinions 42 would be replaced by cranks attached to the shaft 48 while the racks 40 would be replaced by connecting rods between said cranks and the arms 41.

The Type A transmission can be modified to a versatile variable pump. The one-way clutches 1 and 2 are deleted and the output end of the torque shaft is coupled to a pump such as a swash plate pump or a cam type wobble plate pump to which a rotating input may be applied. In such a pump the stroke length automatically adjusts itself according to the back pressure, without any feed-back control. Feed-back control may still be applied to change the transmission characteristics by changing the relevant variables, such as the gyroscopic rotor speed.

Reference was made to the use of gravitational force in the Type B transmission to transfer energy from the input to the output of the transmission. In this case, either of shafts 24, 25 can be outputs or one can be coupled to the output while the other is coupled to the housing. In the following, the use of gravitational force is explained with the shaft 25 coupled to the housing.

Consider FIG. 10 in conjunction with FIG. 6 with a dead mass m with vector M=0, and assume that the inertial forces on the mass m are not significant in comparison with its weight and assume that the axis of the shaft 25 is substantially vertical.

Consider the arm Qm in such a position that the gravity force on the mass m exerts an axial torque on the shaft 25 through the one-way clutch 1. An equal and opposite torque will be applied by the housing on the shaft 25. This will result in a balancing torque being applied on the output body 24 due to the mis-alignment of the shafts 12 and 25. As the output rotates under the action of this balancing force, the mass m drops down to its lowest point giving up its potential energy to the output. At this point the arm Qm is in the plane containing the axes of the shafts 12 and 25. Continued rotation of the output will result in the mass m being raised, causing the application of a torque on the torque shaft 12 in the opposite direction, by the gravity force on m. This will accelerate the torque shaft 12 until it is synchronised with the output 24 through the one-way clutch 2. The transmission is now ready for the next input by which the mass m is raised by reversing the angle ZPQ in FIG. 10. As the angle ZPQ is reversed, the arm Qm will be pointing upwards and the torque on shaft 12 due to the gravity force on m is reversed, causing the shaft 12 to decelerate and synchronise with the shaft 25 through the one-way clutch 1. The process can be repeated. A typical application of this mode of operation of the Type B transmission is in play equipment.

In the following, another form of the transmission is explained with reference to FIG. 13. In this form, the output torque and the reaction torque are applied to the torque shaft 12 via a differential drive mechanism. In its most basic form, the transmission consists of a pair of co-axial shafts 56, 57 one of which is attached to a main fame 58 while the other is rotatable relative to said main frame 58. A sub-frame 59 carrying a suitable mass distribution is rotatably mounted on the main frame 58 with its axis substantially perpendicular to the axis of said co-axial shafts 56, 57. A right-angled drive train 64, 65, 66, 67 to couple the sub-frame 59 to the shaft 57, is rotatably mounted on the main frame 58 so that the differential speed between the said co-axial shafts 56, 57 is transmitted to the sub-frame 59.

One of these co-axial shafts 56, 57 will constitute the torque shaft analogous to the torque shaft 12 of previously described embodiments while the other will be coupled to the input shaft. As before, the torque shaft 57 in the present example will be connected to a driven shaft through one of the one-way clutches and through the other one-way clutch the torque shaft is connected to a rotation reversing mechanism such as shown in FIG. 12 or is connected to a fixed housing 5 of the transmission.

The mass distribution may be a gyroscopic rotor rotatably mounted on the sub-frame 59 with the rotor axis 63 substantially perpendicular to the axis of the sub-frame. Alternatively the mass distribution may consist of a dead mass attached to the sub-frame 59 eccentrically about the sub-frame axis, and in this case the main frame 58 must be fixed to the input shaft.

The transmitted torque can be adjusted by altering the location of the dead mass or by changing the speed of rotation of the gyroscopic rotor about its axis It can be easily shown that as the input shaft 56 rotates, an alternating inertia torque will act on the torque shaft 57 (12), thus the output torque and the reaction torque will be generated. In this arrangement, the algebraic sum of the time integrals of the input torque, output torque and the reaction torque equals zero under ideal cyclic conditions.

Figure 13:
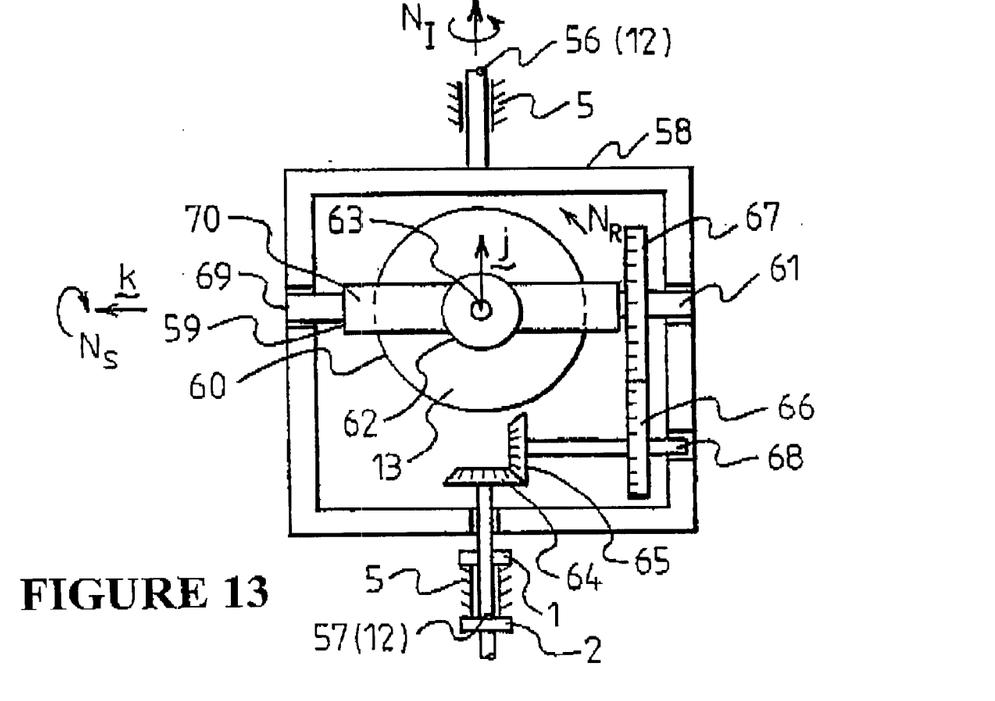
FIG. 13 shows diagrammatically part of another embodiment.

Referring to FIG. 13, one of the co-axial shafts 56 or 57 will be the torque shaft 12, while the other is driven by the input. The main frame 58 is attached to the shaft 56, while the shaft 57 is coupled to the shaft 61 differentially through the right angled gear train consisting of the gears 64, 65, 66 and 67. Gear wheel 64 is attached to the shaft 57, which is rotatably mounted on the main frame 58. The shaft 68 is rotatably mounted on the main frame and the gear wheels 65 and 66 are attached to the shaft 68. A pair of co-axial shafts 61 and 69 are attached to the sub-frame 59 and rotatably mounted on the main frame as shown. The gear wheel 67 is attached to the shaft 61 and meshes with the gear wheel 66, while the gear wheel 64 meshes with the gear wheel 65.

The gyroscopic rotor 60 is attached to the shaft 63, which is rotatably mounted on the sub-frame as shown. The rotor 60 may be driven by a motor 62 or alternatively by the input/output motions as before. Thus, it can be seen that the torque shaft principle can be applied in numerous configurations of continuously variable transmissions employing primarily inertia reactions, but other forces such as gravity are also usefully employed.

In the embodiment of FIG. 13 i, j, k are rotating vectors. θ is the angle made by vector j to the centre line of the transmission, in the direction k.

Vector i is coincident with rotor axis 63. Vector k is coincident with the axis of the gear 67, i.e. axis of rotation of inner frame 70. Vector j is normal to the vectors i and k so that $i \wedge j = k$. $N_I$ is the input speed. $N_S$ is the speed of 70 about k in the direction k.

A, B, C are the moments of inertia of the inner frame 70 assembly excluding the rotor in the directions i, j and k respectively.

$A_R$, $B_R$ and $C_R$ are the moments of inertia of the rotor in the directions i, j and k respectively.

$N_R$ is the speed of the rotor in the direction i.

$t_I$, $t_J$ and $t_K$ are the reaction torques in the directions i, j and k respectively. Under steady conditions, $t_I = i\, N_I N_S \cos\theta (B + B_R - A - C - C_R)$ $t_J = j\{N_I N_S \sin\theta (B + B_R + C + C_R - A) - N_S N_R A_R\}$ $t_K = k\{N_I^2/2\ ^2 \sin 2\theta (A - B - B_R) + A_R N_R N_I \cos\theta\}$ Under free-wheeling conditions the inertia of the gear train and the torque shaft will be considered to determine the relevant factors, such as the cycle period, etc. A cycle consists of one revolution of 70, i.e. θ, 0→360° and during a cycle output, reaction and free-wheeling will occur.

Figure 15:
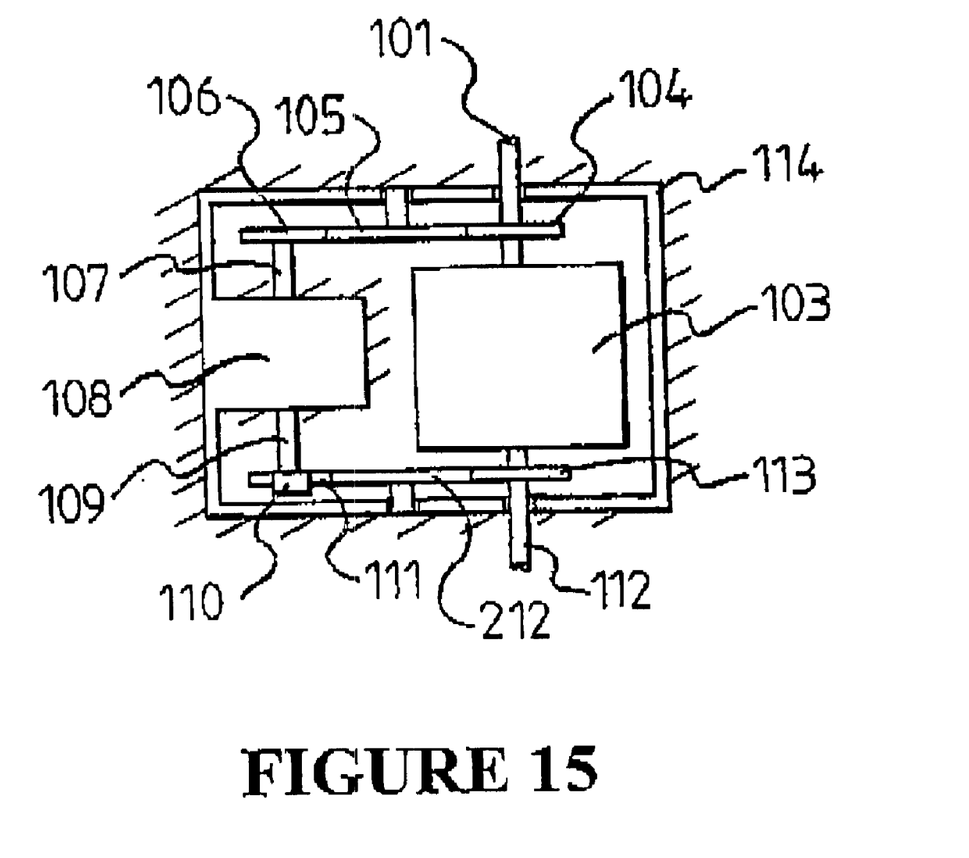

In the embodiments of the invention hitherto described reverse transmission of power from the output to the input is not possible. FIG. 15 illustrates an arrangement whereby it is possible for the output shaft 112 to drive the input shaft 101 when the output shaft 112 is rotating faster than the input shaft 101. This may be advantageous in, for example, automotive applications when it may be desirable to slow down the vehicle without total reliance upon brakes.

In FIG. 15 the transmission of power in the forward direction takes place from the shaft 101 to the shaft 112 through the basic transmission 103. The basic transmission 103 may be any one of those previously described and illustrated, except that a reciprocating input is assumed to be derived from the rotating input 101 with the interposition of a crank and connecting rod system. Input rotation is transmitted from the shaft 101 to the shaft 107 typically by a set of gear wheels such as 104, 105, and 106. The rotation of the shaft 107 is reduced if required, by a variable gear ratio G by the gear unit 108. Shaft 109 is coupled to the output shaft 112 typically by a set of gear wheels such as 111, 212 and 113 and through the one way clutch 110.

Let N9 and N11 be the rotational speeds of the shaft 109 and the gear wheel 111 respectively. In operation when N9 is greater than N11 the shaft 109 remains de-coupled from the gear wheel 111 and hence from the shaft 112. The power transmission takes place from the shaft 101 to the shaft 112 only through the basic transmission 103. If however when N9 equals N11 the gear wheel 111 is coupled to the shaft 109 through the one-way clutch 110.

It may be advantageous to arrange the gear unit 108 so that its gear ratio G can be altered while in operation. In order to do so the gear wheel 111 is conveniently made to free wheel on the shaft 109 by ensuring that N9 is greater than N11 thus avoiding the need for a separate clutch unit.

What is claimed is:

1. A transmission comprising:

a fixed support;

an input member reciprocable along a first axis relative to said fixed support;

a linkage arrangement rotatable about said first axis under the influence of said input member, said linkage arrangement including a torque shaft;

an output member structured and arranged to be rotated about a second axis by the torque shaft;

a first one-way clutch between the torque shaft and the output member; and a gyroscopic rotor mounted on the linkage arrangement and having a spin axis which is cyclically angularly deflected in response to the input member to generate gyroscopic reaction forces, the reaction forces generated by the rotor as said spin axis is cyclically deflected being applied to the torque shaft as positive and negative torque;

wherein the first one-way clutch is structured and arranged to apply the positive torque to the output member;

wherein the torque shaft is connected over a second one-way clutch opposite to the first one-way clutch to said fixed support to apply the negative torque to said fixed support; and wherein the output member can be rotated by the torque shaft in one direction only.

2. The transmission as claimed in claim 1, wherein the output member is a body rotatable about the fixed support, the input member is a drive shaft reciprocable toward and away from said fixed support, the linkage comprises an elbow linkage pivotally connected at one end to the drive shaft and an another end to a frame rotatable with said body, the torque shaft being connected over said second one-way clutch with said fixed support and over said first one-way clutch with the frame.

3. The transmission as claimed in claim 1, wherein the rotor is rotatable about the spin axis with a speed of rotation that is independently variable relative to an input motion to alter the magnitude of reaction forces and thereby the torque being transmitted to the output member.

4. The transmission as claimed in claim 1, wherein the first and second axes are substantially parallel or coincident.

5. The transmission as claimed in claim 1, wherein the gyroscopic rotor is arranged on the linkage arrangement so that said spin axis is angularly deflected in one of a plane containing and parallel with the axis of the input member as the input member reciprocates.

6. The transmission as claimed in claim 5, wherein the linkage arrangement further comprises an elbow linkage pivotally connected at one end to the input member and at another end being immovable relative to the output member along the second axis, the gyroscopic rotor being mounted on one arm of the elbow linkage so that said spin axis can be angularly deflected as the input member reciprocates.

7. The transmission as claimed in claim 1, including a rotatable input shaft connected to the input member via a connecting system to impart reciprocating motion to the input member, wherein the input shaft is additionally coupled to the output member via a further shaft coupled to a third one-way clutch having a gear mounted thereon which is rotatable with a speed of rotation, the input shaft being driven by the output member when the speed of rotation of the gear exceeds that of the further shaft, otherwise, the third one-way clutch is freewheeling.

8. The transmission as claimed in claim 7, wherein the third one-way clutch is coupled to the input shaft via a variable ratio gear system.

9. A transmission comprising:

a fixed support;

an input member reciprocable along a first axis relative to said fixed support;

a linkage arrangement rotatable about said first axis under the influence of said input member, said linkage arrangement including a torque shaft;

an output member structured and arranged to be rotated about a second axis by the torque shaft;

a first one-way clutch between the torque shaft and the output member; and a gyroscopic rotor mounted on the linkage arrangement and having a spin axis which is cyclically angularly deflected in response to the input member to generate gyroscopic reaction forces, the reaction forces generated by the rotor as said spin axis is cyclically deflected being applied to the torque shaft as positive and negative torque;

wherein the first one-way clutch is structured and arranged to apply the positive torque to the output member;

wherein the torque shaft is connected over a second one-way clutch opposite to the first one-way clutch to the output member over a rotation reversal system to apply the negative torque to the output member as positive torque; and wherein the output member can be rotated by the torque shaft in one direction only.

10. The transmission as claimed in claim 9, wherein the gyroscopic rotor is arranged on the linkage arrangement so that said spin axis is angularly deflected in one of a plane containing and parallel with the axis of the input member as the input member reciprocates.

11. The transmission as claimed in claim 9, wherein the linkage arrangement comprises an elbow linkage pivotally connected at one end to the input member and at another end being immovable relative to the output member along the second axis, the gyroscopic rotor being mounted on one arm of the elbow linkage so that said spin axis can be angularly deflected as the input member reciprocates.

12. The transmission as claimed in claim 9, wherein two meshing gears are interposed between the first one-way clutch and the output member and three meshing gears are interposed between the second one-way clutch and the output member such that whichever clutch is not freewheeling will drive the output member in the same sense of rotation.

13. The transmission as claimed in claim 9, wherein the output member is a body rotatable about a fixed support, the input member is a drive shaft reciprocable toward and away from said fixed support, the linkage comprises an elbow linkage pivotally connected at one end to the drive shaft and an another end to a frame rotatable with said body, the torque shaft being connected over said first one-way clutch with said fixed support and over said second one-way clutch with the frame.

14. The transmission as claimed in claim 9, wherein the rotor is rotatable about the spin axis with a speed of rotation that is independently variable relative to an input motion to alter a magnitude of the reaction forces and thereby the torque being transmitted to the output member.

15. The transmission as claimed in claim 9, wherein the first and second axes are substantially parallel or coincident.

16. The transmission as claimed in claim 9, including a rotatable input shaft connected to the input member via a connecting system to impart reciprocating motion to the input member, wherein the input shaft is additionally coupled to the output member via further shaft coupled to a third one-way clutch having a gear mounted thereon which is rotatable with a speed of rotation, the input shaft being driven by the output member when the speed of rotation of the gear exceeds that of the further shaft, otherwise, the third one-way clutch is freewheeling.

17. The transmission as claimed in claim 16, wherein the third one-way clutch is coupled to the input shaft via a variable ratio gear system.

18. A transmission comprising:

a fixed support;

a torque shaft;

an output member arranged to be rotated about a first axis of rotation by the torque shaft;

an input member reciprocable along a second axis;

a linkage arrangement rotatable about the second axis under the influence of said input member;

a first one-way clutch between the torque shaft and the output member; and a gyroscopic rotor mounted on the linkage arrangement and having a spin axis which is cyclically angularly deflected in response to the input member to generate gyroscopic reaction forces, the reaction forces generated by the gyroscopic rotor as said spin axis is cyclically deflected being applied to the torque shaft as positive and negative torque;

said first one-way clutch being configured to apply the positive torque to the output member;

said torque shaft being connected over a second one-way clutch opposite to the first one-way clutch to said support to apply the negative torque to said support; and wherein the output member is rotated by the torque shaft in one direction only.

19. The transmission as claimed in claim 18, wherein the linkage arrangement comprises:

an outer frame fixed relative to the torque shaft and rotatable relative to the input member about a first frame axis; and an inner frame rotatable relative to the outer frame about a second frame axis perpendicular to the first frame axis, the gyroscopic rotor being mounted on the inner frame, and wherein a rotation arrangement rotates the inner frame in response to reciprocation of the input member.

20. The transmission as claimed in claim 19, wherein the spin axis of the gyroscopic rotor is orthogonal to the second frame axis.

21. The transmission as claimed in claim 19, wherein the inner frame is connected to the input member by a connecting rod arrangement.

22. The transmission as claimed in claim 19, wherein the inner frame is connected to the input member by a rack-and-pinion arrangement.

23. The transmission as claimed in claim 18, wherein the input member comprises a drive shaft reciprocable along said first axis, the gyroscopic rotor being arranged on the linkage arrangement so that said spin axis is angularly deflected in one of a plane containing and parallel with the axis of the drive shaft as the drive shaft reciprocates.

24. The transmission as claimed in claim 18, wherein the gyroscopic rotor is rotatable about the spin axis with a speed of rotation that is independently variable relative to an input motion to alter a magnitude of the reaction forces and thereby the torque being transmitted to the output member.

25. The transmission as claimed in claim 18, wherein the first and second axes are substantially parallel or coincident.

26. The transmission as claimed in claim 19, wherein a gear arrangement is provided between the inner frame and the gyroscopic rotor so that an input motion also causes rotation of the gyroscopic rotor.

27. The transmission as claimed in claim 26, wherein the rotor is rotatable about the spin axis with a speed of rotation that is variable relative to an input motion to alter a magnitude of the reaction forces and thereby the torque being transmitted to the output member.

28. The transmission as claimed in claim 18, including a rotatable input shaft connected to the input member via a connecting system to impart reciprocating motion to the input member, wherein the input shaft is additionally coupled to the output member via a further shaft coupled to a third one-way clutch having a gear mounted thereon which is rotatable with a speed of rotation, the input shaft being driven by the output member when the speed of rotation of the gear exceeds that of the further shaft, otherwise, the third one-way clutch is freewheeling.

29. The transmission as claimed in claim 28, wherein the third one-way clutch is coupled to the input shaft via a variable ratio gear system.

30. A transmission comprising:

a fixed support;

a torque shaft;

an output member arranged to be rotated about a first axis of rotation by the torque shaft;

an input member reciprocable along a second axis;

a linkage arrangement rotatable about the second axis under the influence of said input member;

a first one-way clutch between the torque shaft and the output member; and a gyroscopic rotor mounted on the linkage arrangement and having a spin axis which is cyclically angularly deflected in response to the input member to generate gyroscopic reaction forces, the reaction forces generated by the gyroscopic rotor as said spin axis is cyclically deflected being applied to the torque shaft as positive and negative torque;

said first one-way clutch being configured to apply the positive toque to the output member;

said torque shaft being connected over a second one-way clutch opposite to the first one-way clutch to the output member over a rotation reversal system to apply the negative toque to the output member as positive torque; and wherein the output member is rotated by the torque shaft in one direction only.

31. The transmission as claimed in claim 30, wherein the input member comprises a drive shaft reciprocable along said first axis, the gyroscopic rotor being arranged on the linkage arrangement so that said spin axis is angularly deflected in one of a plane containing and parallel with the axis of the drive shaft as the drive shaft reciprocates.

32. The transmission as claimed in claim 30, wherein the gyroscopic rotor is rotatable about the spin axis with a speed of rotation that is independently variable relative to an input motion to alter a magnitude of the reaction forces and thereby the torque being transmitted to the output member.

33. The transmission as claimed in claim 30, wherein the first and second axes are substantially parallel or coincident.

34. The transmission as claimed in claim 30, wherein the linkage arrangement comprises:

an outer frame fixed relative to the torque shaft and rotatable relative to the drive shaft about a first frame axis; and an inner frame rotatable relative to the outer frame about a second frame axis perpendicular to the first frame axis, the gyroscopic rotor being mounted on the inner frame, and wherein a rotation arrangement rotates the inner frame in response to reciprocation of the drive shaft.

35. The transmission as claimed in claim 34, wherein the spin axis of the gyroscopic rotor is orthogonal to the second frame axis.

36. The transmission as claimed in claim 34, wherein the inner frame is connected to the input member by a connecting rod arrangement.

37. The transmission as claimed in claim 34, wherein the inner frame is connected, to the input member by a rack-and-pinion arrangement.

38. The transmission as claimed in claim 34, wherein a gear arrangement is provided between the inner frame and the gyroscopic rotor so that an input motion also causes rotation of the gyroscopic rotor.

39. The transmission as claimed in claim 38, wherein the rotor is rotatable about the spin axis with a speed of rotation that is variable relative to the input motion to vary a magnitude of the reaction forces and thereby the torque being transmitted to the output member.

40. The transmission as claimed in claim 30, including a rotatable input shaft connected to the input member via a connecting system to impart reciprocating motion to the input member, wherein the input shaft is additionally coupled to the output member via a further shaft coupled to a third one-way clutch having a gear mounted thereon which is rotatable with a speed of rotation, the input shaft being driven by the output member when the speed of rotation of the gear exceeds that of the further shaft, otherwise, the third one-way clutch is freewheeling.

41. The transmission as claimed in claim 40, wherein the third one-way clutch is coupled to the input shaft via a variable ratio gear system.

42. A transmission comprising:
a fixed support;
a torque shaft;
an output member structured and arranged to be rotated about a first axis of rotation by the torque shaft;
an input member which is rotatable about a second axis of rotation relative to the fixed support;
a first one-way clutch between the torque shaft and the output member;
a linkage arrangement rotatable about the second axis of rotation under an influence of said input member; and
a gyroscopic rotor carried by the linkage arrangement and having a spin axis which is cyclically angularly deflected in response to the input member to generate gyroscopic reaction forces,
the reaction forces generated by the gyroscopic rotor when said spin axis is cyclically deflected being applied to the torque shaft as positive and negative torque;
the first one-way clutch being structured and arranged to apply the positive torque to the output member;
the torque shaft being connected over a second one-way clutch opposite to the first one-way clutch to said support to apply the negative torque to the support; and
wherein the output member is rotated by the torque shaft in one direction only.

43. The transmission as claimed in claim 42, wherein the gyroscopic rotor is rotatable about the spin axis with a speed of rotation that is independently variable relative to an input force to alter a magnitude of the reaction forces and thereby the torque being transmitted to the output member.

44. The transmission as claimed in claim 42, wherein the first and second axes are substantially parallel or coincident.

45. The transmission as claimed in claim 42 wherein the linkage arrangement comprises an outer frame rotatable about a first frame axis and an inner frame rotatable relative to the outer frame about a second frame axis perpendicular to the first frame axis, the inner frame carrying said gyroscopic rotor.

46. The transmission as claimed in claim 45, wherein the outer frame is fixed relative to the input member for rotation therewith.

47. The transmission as claimed in claim 45, wherein the spin axis of the gyroscopic rotor is orthogonal to the second frame axis.

48. The transmission as claimed in claim 45, wherein the torque shaft is connected by gearing to the inner frame such that torque applied by the rotor to the inner frame when deflected by rotations of the inner and outer frames, will be transmitted to the torque shaft.

49. The transmission as claimed in claim 42, wherein the input member is additionally coupled to the output member via a further shaft coupled to a third one-way clutch having a gear mounted thereon which is rotatable with a speed of rotation, the input member being driven by the output member when the speed of rotation of the gear exceeds that of the further shaft, otherwise, the third one-way clutch is freewheeling.

50. The transmission as claimed in claim 49, wherein the third one-way clutch is coupled to the input member via a variable ratio gear system.

51. A transmission comprising:
a fixed support;
a torque shaft;
an output member structured and arranged to be rotated about a first axis of rotation by the torque shaft;
an input member which is rotatable about a second axis of rotation relative to the fixed support;
a first one-way clutch between the torque shaft and the output member;
a linkage arrangement rotatable about the second axis of rotation under an influence of said input member; and
a gyroscopic rotor carried by the linkage arrangement and having a spin axis which is cyclically angularly deflected in response to the input member to generate gyroscopic reaction forces,
the reaction forces generated by the gyroscopic rotor when said spin axis is cyclically deflected being applied to the torque shaft as positive and negative torque;
the first one-way clutch being structured and arranged to apply the positive torque to the output member;
the torque shaft being connected over a second one-way clutch opposite to the first one-way clutch to the output member over a rotation reversal system to apply the negative torque to the output member as positive torque; and
wherein the output member is rotated by the torque shaft in one direction only.

52. The transmission as claimed in claim 51, wherein the gyroscopic rotor is rotatable about the spin axis with a speed of rotation that is independently variable relative to an input motion to alter a magnitude of the reaction forces and thereby the torque being transmitted to the output member.

53. The transmission as claimed in claim 51, wherein the first and second axes are substantially parallel or coincident.

54. The transmission as claimed in claim 51, wherein the linkage arrangement comprises an outer frame rotatable about a first frame axis and an inner frame rotatable relative to the outer frame about a second frame axis perpendicular to the first frame axis, the inner frame carrying said gyroscopic rotor.

55. The transmission as claimed in claim 54, wherein the outer frame is fixed relative to the input member for rotation therewith.

56. The transmission as claimed in claim 54, wherein the spin axis of the gyroscopic rotor is orthogonal to the second frame axis.

57. The transmission as claimed in claim 54, wherein the torque shaft is connected by gearing to the inner frame such that torque applied by the rotor to the inner frame when deflected by rotations of the inner and outer frames, will be transmitted to the torque shaft.

58. The transmission as claimed in claim 51, wherein the input member is additionally coupled to the output member via a further shaft coupled to a third one-way clutch having a gear mounted thereon which is rotatable with a speed of rotation, the input member being driven by the output member when the speed of rotation of the gear exceeds that of the further shaft, otherwise, the third one-way clutch is freewheeling.

59. The transmission as claimed in claim 58, wherein the third one-way clutch is coupled to the input member via a variable ration gear system.

* * * * *